United States Patent Office 3,008,922
Patented Nov. 14, 1961

3,008,922
N - HETEROCYCLIC SUBSTITUTED ALKYLIDENE) AMINOALKYLSILICON COMPOUNDS AND PROCESS FOR PRODUCING THE SAME
Robert J. Lisanke, Buffalo, N.Y., assignor to Union Carbide Corporation, a corporation of New York
No Drawing. Filed June 27, 1958, Ser. No. 744,900
11 Claims. (Cl. 260—46.5)

This invention relates to new and useful organosilicon compounds. More particularly, the invention relates to organosilicon compounds containing a N-(heterocyclic substituted alkylidene) aminoalkylsilyl grouping wherein the amino group is interconnected to the silicon atom of the silyl grouping through at least three carbon atoms, as new compositions of matter and to a process for producing them.

The compositions of the instant invention are organosilicon compounds which contain at least one silicon atom and a N-(heterocyclic substituted alkylidene) aminoalkylsilyl grouping as represented by the formula:

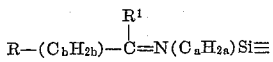

wherein $R^1$ is a monovalent hydrocarbon group or a hydrogen atom, $a$ is an integer having a value of at least 3 and preferably from 3 to 19, $b$ is an integer having a value of from 0 to 3, and R is a monovalent heterocyclic group containing no heterocyclic ring of less than 5 atoms and composed of carbon, hydrogen, one sulfur atom and from 0 to 1 nitrogen atoms, said heterocyclic group containing no other heterocyclic atoms than said sulfur and nitrogen, each silicon atom of the organosilicon compound is bonded to from 1 to 3 oxygen atoms, each silicon bonded oxygen atom is bonded to either a silicon atom or a carbon atom of an alkyl group and each remaining unfilled valence of all silicon atoms is satisfied by no other group than a hydrogen atom or a monovalent hydrocarbon group. Such heterocyclic groups include those containing one sulfur atom in the ring, e.g. thienyl, thiapyranyl, benzothienyl, and the like; those containing one sulfur atom and one nitrogen atom in the ring, e.g. phenothienyl, thiazyl, isothiazyl, benzothiazyl and the like. Such heterocyclic groups also include those that contain a single heterocyclic ring such as thienyl, thiapyranyl, thiazyl and the like, as well as those containing fused rings such as, for example, benzothienyl, phenothienyl, benzothiazyl and the like.

Compositions of this invention which are monomeric are the organosilanes represented by the formula:

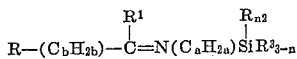

wherein R, $R^1$, $a$ and $b$ have the above-defined meanings and $R^2$ represents a monovalent hydrocarbon group or a hydrogen atom, $R^3$ represents an alkoxy group and ($n$) is an integer of from 0 to 2. The organosilanes which are monofunctional in regard to the silicon atom (i.e. where $n=2$) are, for example, gamma-N-(thienylmethylidene)aminopropyldiethylethoxysilane, gamma-N-(benzothienylmethylidene) aminopropyldiphenylpropoxysilane and the like. Organosilanes which are difunctional in regard to the silicon atom (i.e. where $n=1$) are, for example, delta-N-(isothiazylmethylidene)aminobutylmethyldiethoxysilane, gamma - N - (benzothienylmethylidene)-aminopropylphenyldimethoxysilane and the like. The organosilanes which are trifunctional in regard to the silicon atom (i.e. where $n=0$) are, for example, delta-N-(phenothienylmethylidene)aminobutyltriethoxysilane, delta - N - [thiazyl (methyl) methylidene]aminobutyltributoxysilane, gamma-N-(thienylmethylidene)trimethoxysilane and the like.

The compositions of this invention which are polymeric are the organosiloxanes as represented by the formula:

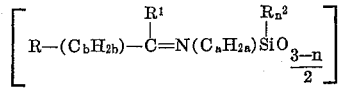

wherein R, $R^1$, $R^2$, $a$, $b$ and $n$ have the above-defined meanings. The organosiloxanes of this invention that are trifunctional in regard to the silicon atom (i.e. where $n=0$) include crosslinked organopolysiloxanes, for example, delta - N - (thienylmethylidene)aminobutylpolysiloxane, gamma-N-(phenothienylmethylidene)aminopropylpolysiloxane and the like. Organosiloxanes of this invention which are difunctional in regard to the silicon atom (i.e. where $n=1$) include the linear and cyclic organosiloxanes. Such linear organosiloxanes are those containing units of the formula:

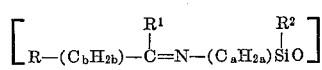

wherein R, $R^1$, $R^2$, $a$ and $b$ have the above-defined meanings. These linear organosiloxanes are, for example, gamma - N - (thienylmethylidene)aminopropylmethylpolysiloxane, delta-N-(benzothiazylmethylidene)aminobutylphenylpolysiloxane and the like. The organosiloxanes which are difunctional in regard to the silicon atom (i.e. where $n=1$) also include cyclic organosiloxanes of the formula:

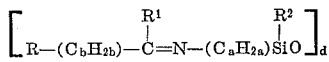

wherein R, $R^1$, $R^2$, $a$ and $b$ have the above-defined meanings and $d$ is an integer of from 3 to 7. These cyclic organosiloxanes are, for example, tetra - gamma - N - (thiazylmethylidene)aminopropyltetraethylcyclotetrasiloxane, penta-delta-N-(thienylmethylidene)aminobutylpentaphenylcyclopentasiloxane, hepta - gamma-N-(thiapyranylmethylidene) aminopropylhepta - ethylcycloheptasiloxane and the like. The organosiloxanes of this invention which are monofunctional in regard to the silicon atom (i.e. where $n=2$) are the dimeric siloxanes, for example, bis-gamma-N-(phenothienylmethylidene)aminopropyldimethyldisiloxane, bis-delta-N-(thiazylmethylidene)aminobutyldiphenyldisiloxane and the like.

Compositions of this invention which are copolymeric are those copolymeric organosiloxanes containing units represented by the formulae:

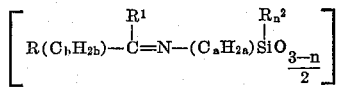

and

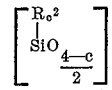

wherein R, $R^1$, $R^2$, $a$, $b$ and $n$ have the above-defined meanings and $c$ is an integer having a value of from 0 to 3, $c$ need not have the same value throughout the same molecule and $n$ need not have the same value throughout the same molecule and $R^2$ can represent the same or different groups within the same molecule. The copolymeric organosiloxanes of this invention include end-blocked linear copolymeric organosiloxane oils, copolymeric cyclic organosiloxanes and copolymeric, resinous organosiloxanes containing the same or different substituted mono-, di- and trifunctional silicon atoms or the compositions of this invention can exist as copolymeric difunctional organosiloxane gums. Such copolymeric organosiloxane oils are those having the formula:

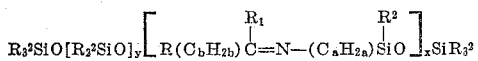

wherein R, R¹, R², a and b have the above-defined meanings, y is an integer, x is an integer of at least 1 and R² represents the same or different groups in the same molecule within its meaning as defined above. Such copolymeric organosiloxane oils are, for example, trimethylsiloxy end-blocked dimethylsiloxane-gamma-N-(thienylmethylidene)aminopropylphenylsiloxane oils, triphenylsiloxy end-blocked diphenylsiloxane-delta-N-(benzothienyl)aminobutylmethylsiloxane oils, tributylsiloxy endblock phenylmethylsiloxane-omega - N - (thiazylmethylidene)aminodecycmethylsiloxane-dimethylsiloxane oils and the like. Such copolymeric cyclic organosiloxanes are, for example, gamma - N-(thienylethylidene)aminopropylheptamethylcyclotetrasiloxane, delta-N-(benzothiazylmethylidene)aminobutylpentaphenylcyclotrisiloxane, gamma-N-(thienyl(ethyl)methylidene)aminopropylnona - methylcyclopentasiloxane and the like. Such copolymeric resinous compositions are, for example:

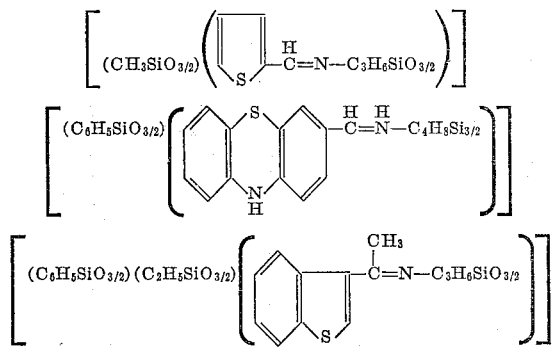

and the like.

In accordance with my invention, the new compounds thereof are prepared by reacting an aldehyde or ketone containing a heterocyclic group with an organosilicon compound containing an aminoalkylsilyl grouping wherein the amino group is interconnected to the silicon atom by at least 3 carbon atoms. The overall reaction can be depicted by the following equation:

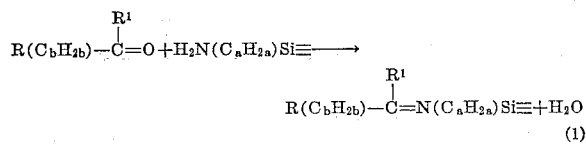

(1)

where R, R¹, a and b have the above-defined values.

The organosilicon compounds containing an aminoalkylsilyl grouping that are useful as starting materials in the preparation of the compositions of this invention are those which contain units of the formula:

$$H_2N(C_aH_{2a})Si\equiv$$

wherein a has the above-defined meaning and the remaining unfilled valences of the silicon are satisfied in the manner described above. Thus, for example, these organosilicon compounds containing an aminoalkylsilyl grouping are monomeric, polymeric or copolymeric.

The monomeric aminoalkylsilicon compounds useful in preparing the compositions of this invention are the aminoalkylsilanes depicted by the formula:

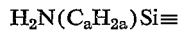

wherein R², R³, n and a have the above-defined meanings. Such aminoalkylsilanes, for example, are gamma-aminopropyltrimethoxysilane, gamma-aminopropylmethyldiethoxysilane, gamma - aminopropyldiphenylmethoxysilane, omega-aminoundecenyltriethoxysilane and the like.

The polymeric organosilicon compounds containing an aminoalkylsilyl grouping that are useful in preparing the compositions of this invention are the aminoalkylsiloxanes depicted by the formula:

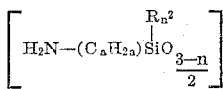

where R², a and n have the above-defined meaning. These materials include the cyclic aminoalkylsiloxanes as well as linear aminoalkylsiloxanes as, for example, where n is 1, the compounds can be in the cyclic form having from 3 to 7 such units or they can be linear having a number of such groupings. These aminoalkylsiloxanes can be prepared by the hydrolysis and condensation of the corresponding alkoxysilanes. Illustrative of the cyclic aminoalkylsiloxanes suitable for use as a starting material are, for example, tetra-gamma-aminopropyltetramethylcyclotetrasiloxane, tetra-delta-aminobutyltetraphenylcyclotetrasiloxane and the like. Illustrative of the linear aminoalkylsiloxanes are gamma-aminopropylphenylpolysiloxane, delta-aminobutylmethylpolysiloxane, delta-aminobutylethylpolysiloxane and the like. Where n is 0 in the above formula, the materials are of the trifunctional variety, such as for example, gamma-aminopropylpolysiloxane, delta-aminobutylpolysiloxane and the like. These aminoalkylsiloxanes can contain residual alkoxyl groups in the siloxane chains or they can comprise essentially completely condensed materials.

The copolymeric aminoalkylsilicon compounds that are useful in preparing the compositions of this invention are those copolymeric organosiloxanes containing the units:

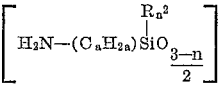

and

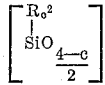

where R², a, c and n have the above-described values. The copolymeric aminoalkylsilicon compound suitable for the preparation of the compositions of this invention include copolymeric organosiloxanes containing various combined siloxane units, such as, trifunctional aminoalkylsiloxane units (where n=0) with difunctional hydrocarbonsiloxane units (where c=2). These copolymeric organosiloxanes also include those other combinations of these units, such as, difunctional aminoalkylsiloxane units (where n=1) with trifunctional hydrocarbon siloxane units (where c=1) and difunctional hydrocarbon units (where c=2) or with any combination of these units so long as it contains at least one aminoalkylsiloxane unit of any type that is mono-, di- or trifunctional. These copolymeric aminoalkylsilicon compounds can be prepared by the cohydrolysis and cocondensation of the corresponding alkoxysilanes. Such copolymers can contain residual silicon-bonded alkoxy groups, or they can comprise essentially completely condensed materials.

The aminoalkylalkoxysilanes and aminoalkylpolysiloxanes as well as copolymers containing aminoalkylsiloxane and hydrocarbonsiloxane units can be prepared by methods known to those in the art.

The aldehydes or ketones containing a heterocyclic group that are useful in producing the compositions of this invention are those of the formula:

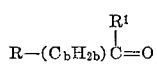

wherein R and R¹ have the above-defined meanings. These aldehyde and ketone starting materials can be prepared by known methods.

The compositions of my invention are produced by forming a mixture of an organosilicon compound containing an aminoalkylsilyl grouping with an aldehyde or ketone containing a heterocyclic group as depicted above and maintaining the mixture at a temperature at which the aminoalkylsilyl grouping of the organosilicon compound and the aldehyde or ketone react. There results, or is produced, water and an organosilicon compound containing an N-(heterocyclic substituted alkylidene)aminoalkylsilicon grouping wherein said amino group is interconnected to a silicon atom through at least three carbon atoms. The alkylidene group attached to the amino nitrogen, when an aldehyde is used, is an alkylidene group which contains, as a substituent, a heterocyclic group. When a ketone as depicted above is used, the alkylidene group contains the heterocyclic grouping depicted above and a monovalent hydrocarbon group.

The relative amounts of the aminoalkylsilyl grouping in the organosilicon compounds and the aldehyde or ketone starting materials is not narrowly critical and can be varied over a wide range. A ratio of amino nitrogen of the aminoalkylsilyl grouping to carbonyl group of the aldehyde or ketone of at least 1 to 1 is advantageous and it is preferred to employ a ratio of at least 1 to 2. No commensurate advantage is gained by using relative amounts other than those described above.

The temperature at which the reaction takes place also is not narrowly critical and can vary from as low as 0° C. to as high at 250° C. It is preferred, however, to carry out the reaction at a temperature of from about 5° C. to 150° C.

The reaction is preferably carried out in a suitable solvent in which both the organosilicon compound containing an aminoalkylsilyl grouping and the aldehyde or ketone are soluble, said solvent being non-reactive therewith. Where the aminoalkylsilicon compound contains alkoxy groups, solvents that are miscible with water are preferred, for example, cyclic ethers such as tetrahydrofuran and dioxane and linear ethers such as the monoalkyl ether of the formula $R^4O(CH_2CH_2O)H$ wherein $R^4$ is an alkyl group of from 1 to 6 carbon atoms since said water miscible solvents minimize the hydrolysis of said alkoxy groups by the water formed in the reaction. When the organosilicon compound containing an aminoalkylsilyl grouping is a polysiloxane, solvents which are not miscible with water are preferred, such as, benzene, toluene, xylene and the like, although the cyclic ethers and other non-reactive solvents described above can be employed, the particular solvent being solely within the selection of one skilled in the art. Solvents that are not miscible with water are particularly useful where siloxanes are used, since the water of reaction can then be easily separated as an azeotrope with these solvents. However, any suitable solvent can be used.

The amount of the solvent within which the reaction is carried out, is not narrowly critical and can be easily determined by one skilled in the art. Amounts of such solvents of from 10 parts to about 400 parts by weight of the organosilicon compound containing an aminoalkylsilyl grouping, and the aldehyde or ketone starting materials can be employed. It is preferred to use such solvents in amounts of from 20 parts to 100 parts by weight of the starting materials. Amounts of such solvents other than those described can be used, but no commensurate advantage is gained thereby.

As has been described above in Equation 1, a byproduct of the reaction is water. This water is preferably removed from the reaction mixture, as by azeotropic distillation by adding thereto a solvent of the above-described type that not only is a solvent for the starting materials, but also forms an azeotrope with water. The water can be separated from the solvent and the solvent returned to the reaction mixture. The water can also be removed by heating the reaction mixture to a temperature sufficiently elevated to vaporize the water or by adding a hydrophilic absorbent or adsorbent to the reaction mixture.

The compounds of this invention are particularly useful as sunscreen agents as well as ultraviolet absorbing agents. The compounds of this invention are also useful as starting materials in the production of substituted aminoalkylsilicon compounds as described and claimed in U.S. application Serial No. 744,937 concurrently filed herewith.

The following examples illustrate my invention;

Example I

Into a 1-liter, three-necked flask equipped with addition funnel, magnetic stirrer, and thermometer were placed gamma-aminopropylmethyldiethoxysilane (221 g., 1.0 mole), and dioxane (250 ml.). The contents of the flask was chilled to about 5° C. by means of an ice bath and 2-methyl-5-acetylthiophene (96 g., 1.0 mole), added dropwise through the addition funnel with good stirring. The addition was completed over a 2 hr. period and was so regulated that the temperature of the reaction mixture did not rise above 40° C. The contents were stirred an additional 2 hr. and dioxane and other volatiles removed through a 10-in. insulated Vigreaux column.

Gamma-N-[2-methyl-5-thienyl(methyl)methylidene] aminopropylmethyldiethoxysilane

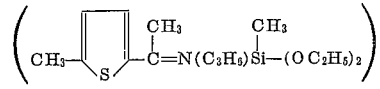

was obtained.

Example II

Delta-aminobutyltriethoxysilane can be reacted with 3-acetyl-benzothiofuran by the procedure described in Example I to yield delta-N-[3-benzothienyl(methyl)methylidene]aminobutyltriethoxysilane

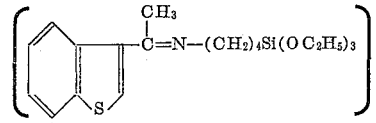

Example III

Omega-aminoundecyltriethoxysilane can be reacted with 4-formylthiazole by the procedure described in Example I to yield omega-N-(4-thiazolylmethylidene)aminoundecyltriethoxysilane

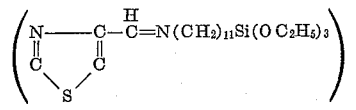

Example IV

A trimethylsiloxy end-blocked dimethylsiloxane oil containing combined gamma-aminopropylmethylsiloxy units can be reacted with 2-acetylbenzothiazole according to the procedure of Example I to yield a trimethylsiloxy end-blocked dimethylsiloxane oil containing combined gamma - N - [2-benzothiazolyl(methyl)methylidene]aminopropylmethylsiloxy units.

Example V

Tetra-gamma - aminopropyltetramethylcyclotetrasiloxane can be reacted with 3-formyl-benzothiafuran according to the procedure described in Example I to yield tetra-gamma - N - (3-benzothienylmethylidene)aminopropyltetramethylcyclotetrasiloxane.

Example VI

Gamma-aminopropyldimethylethoxysilane can be reacted with 4-formylthiazole according to the procedures described in the previous examples to yield gamma-N-(4-thiazylmethylidene)aminopropyldimethylethoxysilane.

Example VII

Delta-aminobutylphenyldibutoxysilane can be reacted with 2-formylbenzothiazole according to the procedures described in the previous examples to yield delta-N-(2-benzothiazylmethylidene)aminobutylphenyldibutoxysilane

Example VIII

Gamma-aminopropylmethyldiethoxysilane can be reacted with 3-formylbenzothiofuran according to the procedures described in the previous examples to yield gamma - N - (3-benzothienylmethylidene) aminopropylmethyldiethoxysilane.

Example IX

Gamma-aminopropylpentamethylcyclotrisiloxane can be reacted with 4-acetylisothiazole according to the procedures described in the previous examples to yield gamma - N - [4-isothiazyl(methyl)methylidene]aminopropylpentamethylcyclotrisiloxane.

Example X

Delta-aminobutylnonamethylcyclopentasiloxane can be reacted with 3-formylthiopyran according to the procedure described in the previous examples to yield delta-N-(3-thiapyranylmethylidene) aminobutylnonamethylcyclopentasiloxane.

Example XI

A phenylmethylsilicone oil containing combined gamma-aminopropylmethylsiloxy units can be reacted with 3-acetylbenzothiofuran according to the procedures described in the previous examples to yield a phenylmethylsilicone oil containing combined gamma-N-(3-benzothienyl(methyl)methylidene)aminopropylmethylsiloxy units.

What is claimed is:

1. An organosilicon compound containing units of the formula:

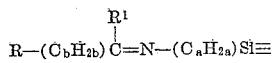

wherein R is a heterocyclic group selected from the class consisting of thienyl, thiapyranyl, benzothienyl, phenothienyl, thiazyl, isothiazyl and benzothiazyl, $R^1$ is selected from the group consisting of the hydrogen atom and monovalent hydrocarbon radical, $a$ is an integer of from 3 to 19, $b$ is an integer of from 0 to 3, said heterocyclic group being interconnected to the

group by a carbon to carbon bond when $b$ is 0 and when $b$ is from 1 to 3 said heterocyclic group being interconnected to the $(C_bH_{2b})$ group through a carbon to carbon bond, each silicon atom is bonded to from 1 to 3 oxygen atoms, each of said silicon bonded oxygen atoms being bonded to no other atoms than a silicon atom and carbon atom of an alkyl group and each remaining unfilled valence of all silicon atoms is satisfied by no other groups than hydrogen atom and monovalent hydrocarbon radical.

2. An organosilane of the formula:

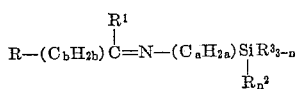

wherein R is a heterocyclic group selected from the class consisting of thienyl, thiapyranyl, benzothienyl, phenothienyl, thiazyl, isothiazyl and benzothiazyl, $R^1$ is a member of the group consisting of the hydrogen atom and monovalent hydrocarbon radical, $R^2$ is a member of the group consisitng of the hydrogen atom and monovalent hydrocarbon radical, $R^3$ is an alkoxy group, $a$ is an integer of from 3 to 19, $b$ is an integer of from 0 to 3, said heterocyclic group being interconnected to the

group by a carbon to carbon bond when $b$ is 0 and when $b$ is from 1 to 3 said heterocyclic group being interconnected to the $(C_bH_{2b})$ group through a carbon to carbon bond, and $n$ is an integer of from 0 to 2.

3. An organosiloxane of the formula:

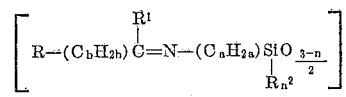

wherein R is a heterocyclic group selected from the class consisting of thienyl, thiapyranyl, benzothienyl, phenothienyl, thiazyl, isothiazyl and benzothiazyl, $R^1$ is a member of the group consisting of the hydrogen atom and monovalent hydrocarbon radical, $R^2$ is a member of the group consisting of the hydrogen atom and monovalent hydrocarbon radical, $a$ is an integer of from 3 to 19, $b$ is an integer of from 0 to 3, said heterocyclic group being interconnected to the

group by a carbon to carbon bond when $b$ is 0 and when $b$ is from 1 to 3 said heterocyclic group being interconnected to the $(C_bH_{2b})$ group through a carbon to carbon bond, and $n$ is an integer of from 0 to 2.

4. A cyclic organosiloxane of the formula:

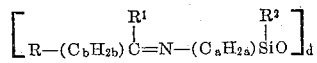

wherein R is a heterocyclic group selected from the class consisting of thienyl, thiapyranyl, benzothienyl, phenothienyl, thiazyl, isothiazyl and benzothiazyl, $R^1$ is a member of the group consisting of the hydrogen atom and monovalent hydrocarbon radical, $R^2$ is a member of the group consisting of the hydrogen atom and monovalent hydrocarbon radical, $a$ is an integer of from 3 to 19, $b$ is an integer of from 0 to 3, said heterocyclic group being interconnected to the

group by a carbon to carbon bond when $b$ is 0 and when $b$ is from 1 to 3 said heterocyclic group being interconnected to the $(C_bH_{2b})$ group through a carbon to carbon bond, and $d$ is an integer of from 3 to 7.

5. An organosiloxane containing the unit formula:

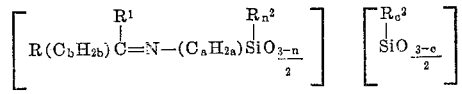

wherein R is a heterocyclic group selected from the class consisting of thienyl, thiapyranyl, benzothienyl, phenothienyl, thiazyl, isothiazyl and benzothiazyl, $R^1$ is a member of the group consisting of the hydrogen atom and monovalent hydrocarbon radical, $R^2$ is a member of group consisting of the hydrogen atom and monovalent hydrocarbon radical, $a$ is an integer of from 3 to 19, $b$ is an integer of from 0 to 3, said heterocyclic group being interconnected to the

group by a carbon to carbon bond when $b$ is 0 and when $b$ is from 1 to 3 said heterocyclic group being interconnected to the $(C_bH_{2b})$ group through a carbon to carbon bond, $n$ is an integer of from 0 to 2, and $c$ is an integer of from 0 to 3.

6. An organosiloxane of the formula:

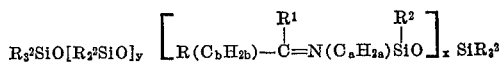

wherein R is a heterocyclic group selected from the class consisting of thienyl, thiapyranyl, benzothienyl, phenothienyl, thiazyl, isothiazyl and benzothiazyl, $R^1$ is a member of the group consisting of the hydrogen atom and monovalent hydrocarbon radical, $R^2$ is a member of the group consisting of the hydrogen atom and monovalent hydrocarbon radical, $a$ is an integer of from 3 to 19, $b$ is an integer of from 0 to 3, said heterocyclic group being interconnected to the

group by a carbon to carbon bond when $b$ is 0 and when $b$ is from 1 to 3 said heterocyclic group being interconnected to the ($C_bH_{2b}$) group through a carbon to carbon bond, $y$ is an integer and $x$ is an integer of at least 1.

7. Gamma - N-[2 - methyl-5 - thienyl(methyl)methylidene]-aminopropylmethyldiethoxysilane.

8. A process for producing organosilicon compounds containing a N-(heterocyclic substituted alkylidene)-aminoalkylsilyl grouping which comprises forming a mixture of an organosilicon compound containing the aminoalkylsilyl grouping which is represented by the formula:

$$H_2N(C_aH_{2a})Si\equiv$$

wherein $a$ is an integer of from 3 to 19, the silicon atom is attached to from 1 to 3 oxygen atoms, said oxygen atoms being bonded to no other atoms than a carbon atom of an alkyl group and a silicon atom and each remaining unfilled valence of silicon being satisfied by no other groups than the hydrogen atom and monovalent hydrocarbon radicals and a carbonyl compound of the formula:

wherein $R^1$ is a member of the group consisting of the hydrogen atom and monovalent hydrocarbon radicals, R is a monovalent heterocyclic group selected from the class consisting of thienyl, thiapyranyl, benzothienyl, phenothienyl, thiazyl, isothiazyl and benzothiazyl,, and $b$ is an integer of from 0 to 3, whereby said carbonyl compound and said organosilicon compound containing aminoalkylsilyl grouping react to produce said organosilicon compound containing a N-(heterocyclic substituted alkylidene) aminoalkylsilyl grouping.

9. A process for producing organosilicon compounds containing a N-(heterocyclic substituted alkylidene)-aminoalkylsilyl grouping, which comprises forming a mixture of an organosilicon compound containing units of the formula:

$$H_2N—(C_aH_{2a})Si\equiv$$

wherein $a$ is an integer of from 3 to 19, the silicon atom is attached to from 1 to 3 oxygen atoms, said oxygen atoms being bonded to no other atoms than a carbon atom of an alkyl group and a silicon atom and each remaining unfilled valence of silicon being satisfied by no other groups than a hydrogen atom and monovalent hydrocarbon radicals, and a carbonyl compound of the formula:

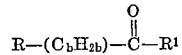

wherein $R^1$ is a member of the group consisting of the hydrogen atom and monovalent hydrocarbon radicals, R is a monovalent heterocyclic group selected from the class consisting of thienyl, thiapyranyl, benzothienyl, phenothienyl, thiazyl, isothiazyl and benzothiazyl, and $b$ is an integer of from 0 to 3, said heterocyclic group being interconnected to the

group by a carbon to carbon bond when $b$ is 0 and when $b$ is from 1 to 3 said heterocyclic group being interconnected to the ($C_bH_{2b}$) group through a carbon to carbon bond, and maintaining said mixture at a temperature at which said carbonyl compound and said organosilicon compound containing an aminoalkylsilyl grouping react to produce said organosilicon compound containing a N-(heterocyclic substituted alkylidene)-aminoalkylsilyl grouping.

10. A process as claimed in claim 9 wherein the temperature is from 5° C. to 250° C.

11. A process for producing organosilicon compounds containing a N-(heterocyclic substituted alkylidene)-aminoalkylsilyl grouping, which comprises forming a mixture of an organosilicon compound containing an aminoalkylsilyl grouping which is represented by the formula:

$$H_2N(C_aH_{2a})_aSi\equiv$$

wherein $a$ is an integer of from 3 to 19, the silicon atom is attached to from 1 to 3 oxygen atoms, said oxygen atoms being bonded to no other atom than a carbon of an alkyl group and a silicon atom and each remaining unfilled valence of silicon is satisfied by no other groups than a hydrogen atom and monovalent hydrocarbon radicals and a carbonyl compound of the formula:

wherein $R^1$ is a member of the group consisting of the hydrogen atom and monovalent hydrocarbon radicals, R is a monovalent heterocyclic group selected from the class consisting of thienyl, thiapyranyl, benzothienyl, phenothienyl, thiazyl, isothiazyl and benzothiazyl, $b$ is an integer of from 0 to 3, said heterocyclic group being interconnected to the

group by a carbon to carbon bond when $b$ is 0 and when $b$ is from 1 to 3 said heterocyclic group being interconnected to the ($C_bH_{2b}$) group through a carbon to carbon bond, and a solvent, and maintaining said mixture at a temperature at which said carbonyl compound and said organosilicon compound containing an aminoalkylsilyl grouping react to produce said organosilicon compound containing a N-(heterocyclic substituted alkylidene)aminoalkylsilyl grouping.

References Cited in the file of this patent

UNITED STATES PATENTS 2,762,823    Speier             Sept. 11, 1956

OTHER REFERENCES

Chemistry of Heterocyclic Compounds (Morton), published by McGraw-Hill Book Co., Inc. (1946), N.Y.
Chem. Abs. 48, 2685 (g) 1954.
Chem. Abs. 34, 756 (5), 1940.
Chem. Abs. 45, 5676 (d) 1951.